(12) United States Patent
Wrife

(10) Patent No.: US 6,950,151 B1
(45) Date of Patent: Sep. 27, 2005

(54) DEVICE FOR CHANGING CHANNELS IN A DIGITAL TELEVISION RECEPTION SYSTEM

(75) Inventor: Kenneth Wrife, Djursholm (SE)

(73) Assignee: Omicron Ceti AB, Kista (SE)

(*) Notice: Subject to any disclaimer, the term of this patent is extended or adjusted under 35 U.S.C. 154(b) by 0 days.

(21) Appl. No.: 09/979,046

(22) PCT Filed: May 16, 2000

(86) PCT No.: PCT/SE00/00966

§ 371 (c)(1),
(2), (4) Date: Feb. 13, 2002

(87) PCT Pub. No.: WO00/70876

PCT Pub. Date: Nov. 23, 2000

(30) Foreign Application Priority Data

May 17, 1999 (SE) .................................... 9901775

(51) Int. Cl.[7] .............................................. H04N 5/50
(52) U.S. Cl. ..................................... 348/731; 348/732
(58) Field of Search ............................... 348/731, 732, 348/734, 725, 706, 554; 725/38

(56) References Cited

U.S. PATENT DOCUMENTS

| | | | |
|---|---|---|---|
| 6,118,498 A * | 9/2000 | Reitmeier | 348/725 |
| 6,334,217 B1 * | 12/2001 | Kim | 725/38 |
| 6,369,861 B1 * | 4/2002 | Lownes | 348/731 |
| 6,714,264 B1 * | 3/2004 | Kempisty | 348/732 |

FOREIGN PATENT DOCUMENTS

| | | |
|---|---|---|
| EP | 0 660 603 A2 | 6/1995 |
| EP | 0 715 456 A2 | 6/1996 |
| JP | 10-190617 | 7/1998 |
| JP | 10-294932 | 11/1998 |

OTHER PUBLICATIONS

International Search Report for PCT/SE00/00966, dated Jun. 22, 2000.

* cited by examiner

Primary Examiner—Victor R. Kostak
(74) Attorney, Agent, or Firm—Pillsbury Winthrop Shaw Pittman LLP

(57) ABSTRACT

A device for changing channels in a digital TV reception system including an image display unit is presented. A communication link is connected to a memory unit that has two-way coupling with the channel selector of the image display unit. The memory unit is arranged to continuously store in the respective shift register of the memory unit a sequence of information, corresponding to at least one complete digital basic image and modifications between it and a next basic image, from several TV channels. A basic image pointer is associated with each shift unit of the memory unit, the basic image pointer continuously specifying a position of the basic image in the shift register associated with each shift unit, such that the selected TV channel after decompression is accessible for display on the screen by means of a control unit through the channel selector and the memory unit.

12 Claims, 3 Drawing Sheets

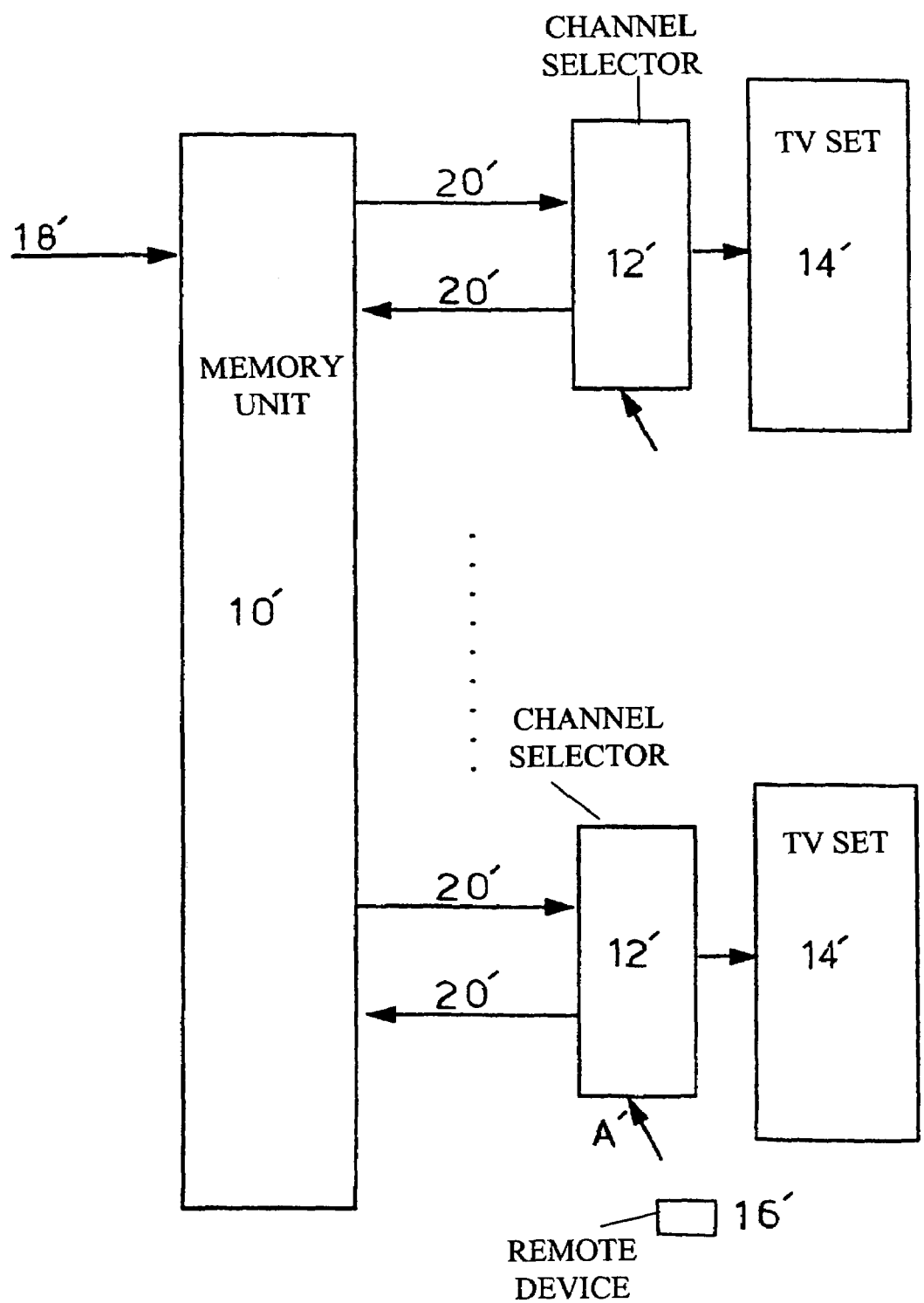

DEVICE FOR CHANGING CHANNELS IN A DIGITAL TELEVISION RECEPTION SYSTEM

CROSS-REFERENCE TO RELATED APPLICATIONS

BACKGROUND OF THE INVENTION

1. Field of the Invention

The present invention concerns a device for changing channels in a digital television reception system with at least one image display unit in the form of a television set or equivalent for the reception of several television channels over an incoming communication link and display of the desired TV channel on the screen of the image display unit.

2. Description of the Related Art

It is well known that traditional, analogue TV reception systems will in the future gradually be replaced by digital TV reception systems. Further, certain interface units will become superfluous, which will lead to shorter signal processing times and in this way, also shorter transfer times. The new digital TV reception systems have the additional advantage that both image and sound quality are improved. However, it is generally known for one skilled in the art that a certain time delay will arise in association with changing between different TV channels in such digital TV reception systems, and this can, in certain cases, can be experienced as a not inconsiderable source of irritation. Various coupling systems are also already known that have been designed with the intention of making possible a more rapid changing of channels between the said TV channels.

Thus, for example, document JP 10190617 shows a coupling arrangement with an image signal decoding device with reduced delay time, whereby the rate of swapping images is improved when changing between different TV channels. The known construction includes for the intended purpose a separate, extra connection loop, whereby several different components, such as buffer memory and temporary memory, are exploited.

SUMMARY OF THE INVENTION

The aim of the present invention is, as it is in the known construction according to the partial description given above, primarily to make possible rapid change of channel in a digital TV reception system. Thus it should be possible to carry out rapid "zapping" between different TV channels by means of, for example, a remote control device. Furthermore, the new arrangement is to have a simpler construction than known connection arrangements, so that no expensive investment costs are required for its accomplishment.

The intended aims are achieved with the aid of a device for changing channels defined in the introduction, which makes possible a considerable reduction in the time for changing TV channels. The new device is characterised primarily in that the communication link is connected to a memory unit having two-way coupling to the channel selector of the image display unit, whereby the memory unit is arranged to continuously store in the respective shift register a short sequence of information, corresponding to at least one complete digital image, from several TV channels to which access is desired, such that the selected TV channel is directly accessible for display on the screen through control by means of a control unit through the channel selector and the memory unit.

Preferred embodiments of the device defined above for changing channels in a digital TV reception system are revealed by the non-independent claims.

BRIEF DESCRIPTION OF THE DRAWINGS

The invention will now be described more closely with reference to the attached drawings.

FIG. 3 shows a sketch of the principle of an alternative embodiment of a TV reception system that includes several image display units, whereby the principles according to the invention are exploited.

DETAILED DESCRIPTION OF THE INVENTION

Figure 1:
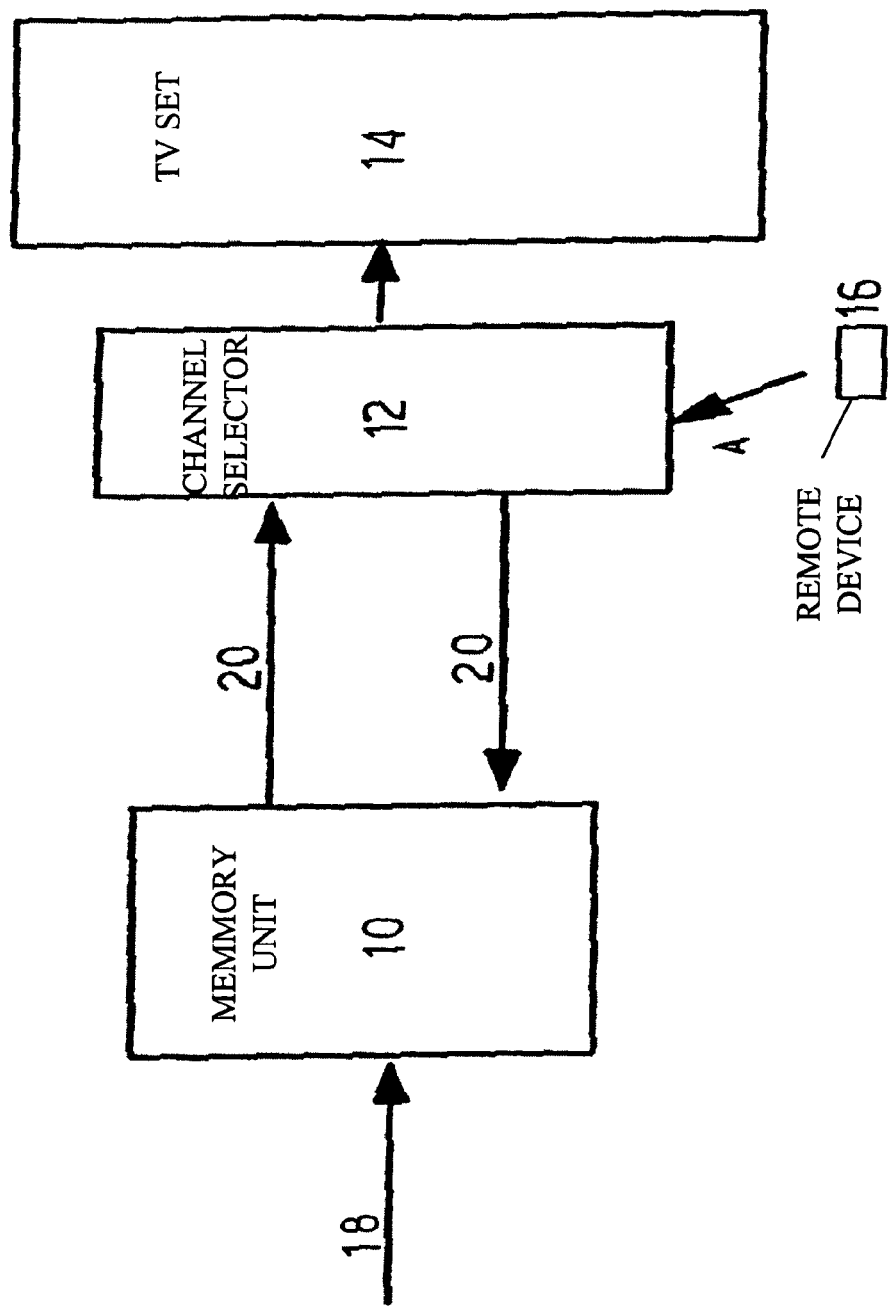
FIG. 1 shows a primary wiring diagram, which makes clear the use of the new device for changing channels according to the invention in association with a TV reception system of digital type, which includes a single TV set.

The example embodiment that is shown in FIG. 1 refers to a TV reception system whose main components consist of a memory unit 10, a channel selector 12, a TV set 14 and a remote control device 16. However, it should be clearly pointed out here that it is naturally possible to exploit the invention also in association with any other type of image display unit, for example, a computer; and that the remote control unit concerns only a special control device for the desired choice of channel.

An incoming TV communication link 18 is suggested at the far left of FIG. 1 that transfers all of the TV channels that can be displayed on the screen (not shown) of the TV set 14. The TV channels coming in over the communication link 18 are encoded in digital form in a known manner. In the memory unit 10 built up according to the principles of the invention, continuous storage occurs of a short sequence of a large number of incoming TV channels. It should, however, be noted that it is only a very short sequence of the signal stream that arrived most recently that is stored for each of the said TV channels. The stored sequence should be of such nature that it always contains information corresponding to at least one complete digital TV image. In those cases in which the incoming digital signal is encoded according to the known MPEG-2 Standard (where MPEG is an acronym for Moving Pictures Expert Group) the stored sequence must contain at least one so-called "I-frame". By means of the two-way transfer channel 20 the chosen/set TV channel is sent onwards from the memory unit 10. The horizontal arrows that are drawn on the diagram specify the direction of transfer. The incoming digital signal is decompressed in the channel selector 12 and forwarded for display on the screen of the image display unit 14.

The memory unit 10, the channel selector 12 and the TV set 14 can, in an alternative embodiment that is not shown in the diagram, be wholly or partially integrated as desired, in order to form a single unit. The arrow A in FIG. 1 indicates that change of TV channel is achieved with the aid of the remote control unit 16. The information signal concerning change of channel that is received by the channel selector 12 results in transfer of the information signal from the channel selector 12 to the memory unit 10 through the transfer channel 20. The last stored sequence of the desired channel will then be selected in the memory unit 10. The selected stored sequence, corresponding to one TV image, is now transferred to the channel selector 12 and the desired TV channel will subsequently be continuously transferred over the communication link 18, the memory unit 10, the transfer channel 20 and the channel selector 12 to the image display unit 14 for display on its screen.

Alternative embodiments of the memory unit 10 will now be further discussed.

The digital image compression is, as is known, based on the principle that a basic image is transmitted at fixed intervals, whereby only modifications in the actual image occur between basic images. In the alternatives that are described below both the case in which all TV channels are handled and the case in which only a selection are handled occur. Handling of a selection can, for example, be based on the principle of the "most recently selected channels".

Figure 2:
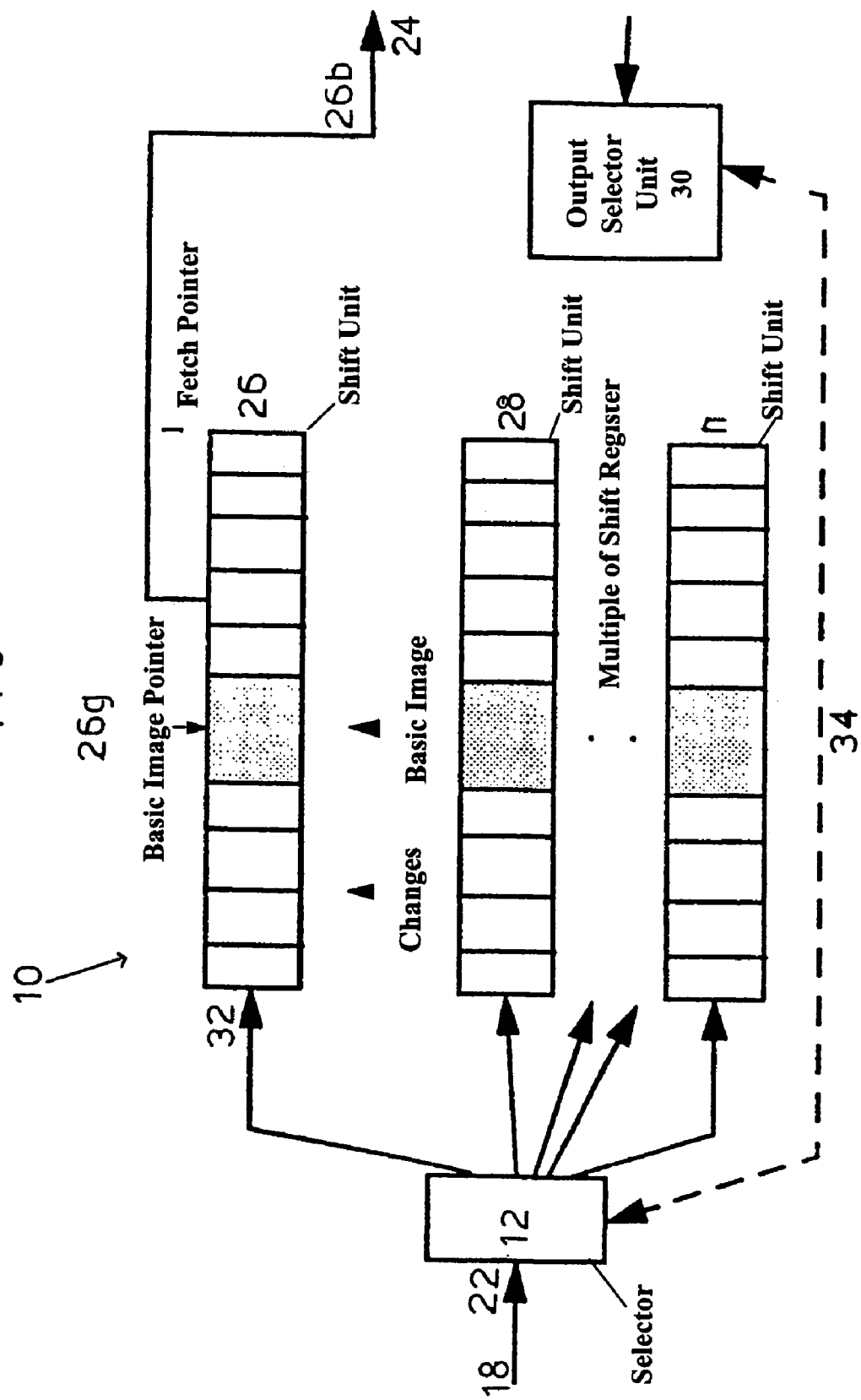
FIG. 2 shows in more detail the relationships between the various components in the memory unit in the TV reception system constructed according to FIG. 1.

FIG. 2 should be referred to during the description of the alternatives for construction of the memory unit 10 that are given below.

Alternative 1

When this alternative is used, a delay of all channels is achieved and synchronisation occurs at the basic image. The basic image and the modifications are successively shifted from the input 22 of the memory unit 10 to its output 24. The incoming communication link 18 provides information concerning all TV channels. A selector 12 arranged in the memory unit 10 is arranged to look after transfer of each incoming TV channel to the shift unit 26, 28, . . . , n that corresponds to the channel. Thus one shift unit exists for each TV channel. The shift register associated with each shift unit 26, 28, . . . , n must be sufficiently large that it has space sufficient for at least one basic image ("I-frame" according to the previously mentioned MPEG-2 Standard from the Moving Picture Expert Group) and all of the modifications up until the next basic image. A special basic image pointer register 26g belongs to each shift unit 26, 28, . . . , n that indicates the position of the basic image in the shift register. When the basic image is moved in the shift register (from left to right in FIG. 2) the basic image pointer follows with it, so that it always indicates the position of the basic image.

Furthermore, there exists a special image fetch pointer register 26b that points from the location in the shift unit from which the current TV image of modification is being fetched to the output 24 of the memory unit 10. The fetch pointer of the image fetch pointer register 26b will remain stationary, in contrast to the previously described basic image pointer.

In the alternative arrangement according to FIG. 3, the various components that are included in the memory unit 10 have the same identifiers as the equivalent components in FIG. 1, with the addition of a prime mark. A single memory unit 10' is shown in FIG. 3, and it is used by several TV sets 14' with their respective channel selectors 12'. Such an arrangement may be found, for example, in a block of flats with TV sets in different flats. The memory unit 10' is in this case designed such that it includes outputs that correspond to the respective TV sets 14', whereby one fetch pointer is arranged for each output. Each fetch pointer fetches the current TV image and/or modifications, if any, for transfer to the screen of the respective TV set 14' through the channel selector 12', whereby an equivalent selector unit arranged in the memory unit 10' is arranged to move the fetch pointer on change of channel to the image fetching position in the shift register that corresponds to the selected TV channel. It should be noted that there is naturally a two-way coupling 20' between the memory unit 10' and each of the channel selectors 12' of the TV sets 14'. Two TV sets 14' are shown in FIG. 3, but the figure also suggests that many more can exist.

When a change of channel is desired with the aid of the remote control unit 16 (FIG. 1) an output selector unit 30 (which is stationary when transfer occurs from the same TV channel) moves the fetch pointer to the basic image pointer that is relevant for the shift register of the selected TV channel. In this way, a basic image will always be the first object that is transmitted after a change of TV channel. Image information that is transmitted from the memory unit 10 will thus have a maximal delay time that corresponds to the delay time of the shift register. The output selector unit 30 contains information about which TV channel currently exists in the respective shift units 26, 28, . . . , n. This information is transmitted over the connection 34 shown with a dashed line.

The selector 12 is so constructed that if the number of incoming TV channels is less than or equal to the number of shift units 26, 28, . . . , n, the selector 12 chooses one unit per TV channel. In the case in which the number of incoming TV channels is larger than the number of shift units 26, 28, . . . , n, either fixed channels can be selected or the latest of the channels selected by the output selector 30 can be fed into the shift unit 26, 28, . . . , n.

Alternative II

A forced image construction is achieved in this embodiment with synchronisation at fill image. This means that a significant change relative to the arrangement according to Alternative 1 occurs. When a change of channel is desired by means of the remote control unit 16 in FIG. 1, the fetch pointer is moved to the basic image pointer that is relevant for the shift register of the selected TV channel and the basic image is fetched. After this the fetch pointer is moved and data is subsequently fetched as rapidly as is possible (forced) against the input 32 of the shift register (at the left in FIG. 2). In this way, image construction can thus occur in a forced manner in the TV set 14 and delay of the image information is reduced to a minimum.

Alternative III

The difference between this embodiment and the embodiment according to Alternative II is that output information does not commence with the basic image but from the end of the selected shift register, when change of channel is desired. After this, information is shifted/fetched from the complete shift register and is forced to the output.

Modifications of the coupling arrangements described over for changing channels in systems with one or more connected TV sets can, of course, exist. For example, the memory and the channel selector can be integrated into a single unit instead of being coupled together by a two-way communication link, as is shown in the figures.

What is claimed is:

1. A device for changing channels in a digital TV reception system with an image display unit in the form of at least one TV set or equivalent for the reception of several TV channels over an incoming communication link and display of the desired TV channel on the screen of the image display unit, wherein the communication link is connected to a memory unit in the shape of a shift register that has two-way coupling with the channel selector of the image display unit, whereby the memory unit is arranged to continuously store in the respective shift register a sequence of information, corresponding to at least one complete digital basic image and modifications between it and a next basic image, from several TV channels to which access is desired, and wherein a basic image pointer is associated with each shift unit of said memory unit, said basic image pointer continuously specifying a position of the basic image in the shift register associated with each shift unit, such that the selected TV channel after decompression is accessible for display on the screen through control by means of a control unit through the channel selector and the memory unit.

2. The device according to claim 1, wherein the memory unit and the channel selector are integrated into a single unit.

3. The device according to claim 1, wherein the memory unit and the channel selector are separate.

4. The device according to claim 1, wherein a fetch pointer in collaboration with the channel selector fetches at least one of the current basic image and set of modifications for transfer to the screen through the channel selector, and an output selector arranged in the memory unit is arranged to move the fetch pointer during change of channel to the position for fetching the image in the shift register of the selected TV channel.

5. The device according to claim 1, wherein several image display units are connected through their respective channel selectors to the same memory unit and the desired TV channel can be separately selected for each image display unit.

6. The device according to claim 5, wherein a separate fetch pointer is associated with each channel selector and an equivalent output selector arranged in the memory unit is arranged to move the fetch pointer during change of channel to the position for fetching the image in the shift register of the selected TV channel.

7. The device according to claim 4, wherein the fetch pointer is moved during change of channel to the basic image pointer in the shift register of the selected TV channel.

8. The device according to claim 7, wherein the fetch pointer is moved immediately to the input of the shift register following fetching of the basic image during change of channel.

9. The device according to claim 4, wherein the fetch pointer is forced to move during change of channel to the end of the selected shift register, after which information from the complete shift register is forcibly extracted.

10. The device according to claim 1, wherein the control unit is a remote control device, specially intended for use with a TV set.

11. A device for changing channels in a digital TV reception system with an image display unit in the form of at least one TV set or equivalent for the reception of several TV channels over an incoming communication link and display of the desired TV channel on the screen of the image display unit, wherein the communication link is connected to a memory unit in the shape of a shift register that has two-way coupling with the channel selector of the image display unit, whereby the memory unit is arranged to continuously store in the respective shift register a sequence of information, corresponding to at least one complete digital basic image, from several TV channels to which access is desired, such that the selected TV channel after decompression is accessible for display on the screen through control by means of a control unit through the channel selector and the memory unit, and wherein several image display units are connected through their respective channel selectors to the same memory unit and the desired TV channel can be separately selected for each image display unit.

12. The device according to claim 11, wherein the shift register has space for information corresponding to at least one basic image and modifications between it and the next basic image, associated with each shift unit there is a basic image pointer that continuously specifies the position of the basic image in the shift register, a separate fetch pointer is associated with each channel selector and an equivalent output selector arranged in the memory unit is arranged to move the fetch pointer during change of channel to the position for fetching the image in the shift register of the selected TV channel.

* * * * *

UNITED STATES PATENT AND TRADEMARK OFFICE
CERTIFICATE OF CORRECTION

PATENT NO. : 6,950,151 B2  
APPLICATION NO. : 09/979046  
DATED : September 27, 2005  
INVENTOR(S) : Wrife Page 1 of 1

It is certified that error appears in the above-identified patent and that said Letters Patent is hereby corrected as shown below:

On the Title Page, in Field (56), under "FOREIGN PATENT DOCUMENTS", in Column 2, Line 4, delete "10-294932" and insert -- 10-294930 --, therefor.

In Column 4, Line 29, delete "fill" and insert -- full --, therefor.

Signed and Sealed this

Twentieth Day of October, 2009

David J. Kappos
*Director of the United States Patent and Trademark Office*